Jan. 24, 1956
R. C. FREVIK
2,731,897
ADJUSTING MECHANISM FOR FARM IMPLEMENTS
Filed Jan. 5, 1950
3 Sheets-Sheet 1
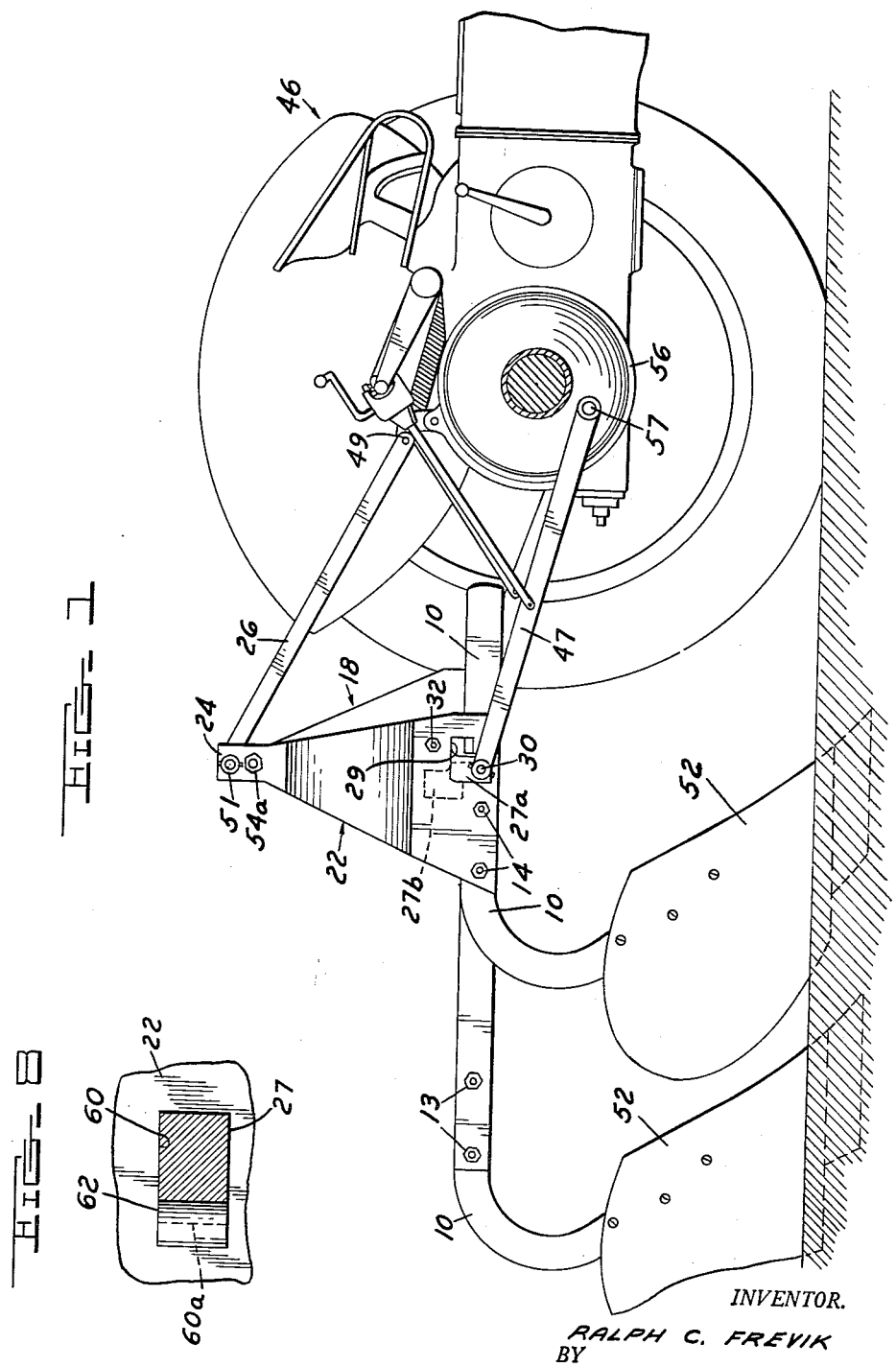
INVENTOR.
RALPH C. FREVIK
BY
W. O. Schaich
ATTORNEY

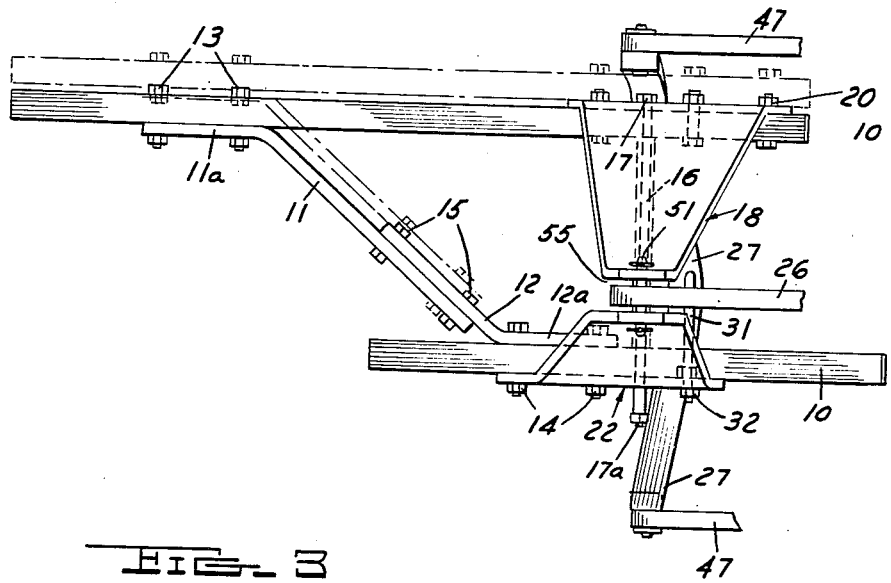
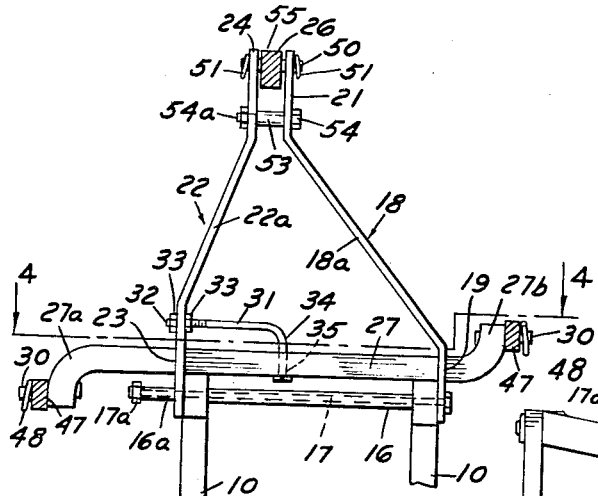
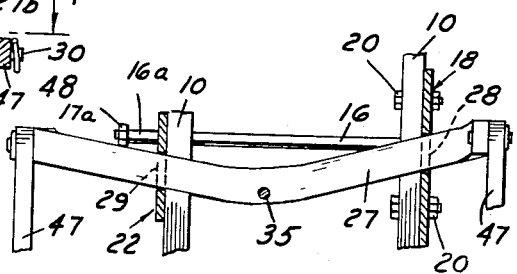

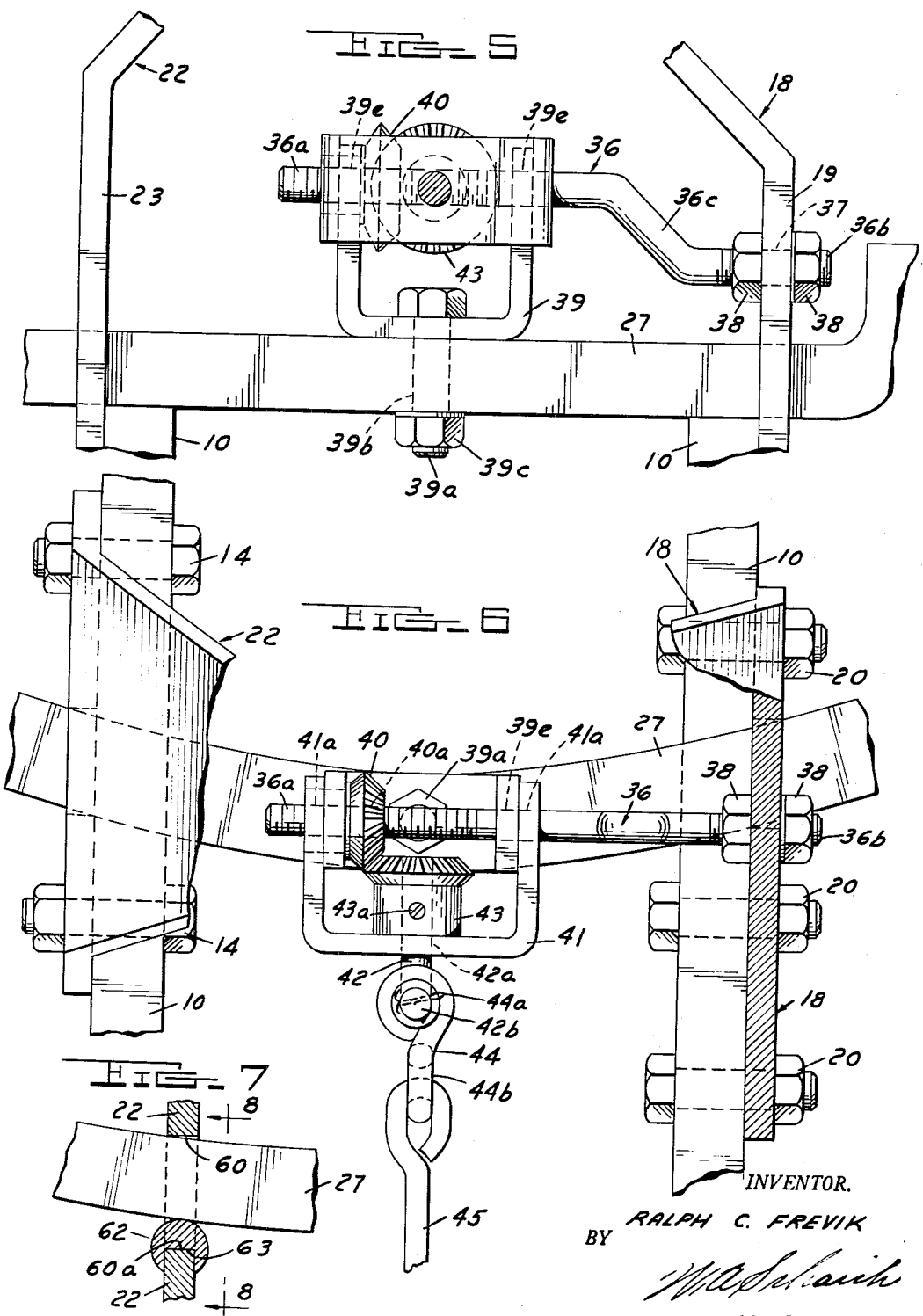

United States Patent Office 2,731,897
Patented Jan. 24, 1956

2,731,897
ADJUSTING MECHANISM FOR FARM IMPLEMENTS

Ralph C. Frevik, Detroit, Mich., assignor, by mesne assignments, to Ford Motor Company, Dearborn, Mich., a corporation of Delaware Application January 5, 1950, Serial No. 136,885

7 Claims. (Cl. 97—47.55)

This invention relates to a simplified frame construction for tractor carried, lift type implements, and particularly to an improved cutting width adjustment for plows.

Known types of plow frames commonly utilized for supporting two or more plow bottoms for attachment to a tractor of the type having power lifted hitch links require the use of fairly complicated dies and costly manufacturing techniques to produce the various components. Not only have such plow frames been relatively expensive to produce but they lacked any adjustment of the spacing of the plow beams which necessarily requires that a separate plow frame be used for each of the large variety of size of plow bottoms utilized across the country.

It is also known that the various mechanisms heretofore employed for changing the angularity of the plow bottoms or other tools relative to the line of draft are complicated, expensive to manufacture, and cumbersome and awkward for the operator to adjust. Furthermore, it has been necessary for the operator to dismount from the tractor to adjust such mechanism, which is both time consuming and tiresome especially when such adjustments are frequently required, as when plowing on the contour.

Accordingly, it is an object of this invention to provide a simplified yet rugged frame and adjusting mechanism for a tractor drawn farm implement.

Another object of this invention is to provide an improved adjusting mechanism for a lift type moldboard plow which can be quickly and easily adjusted to vary the width of furrow being formed by the plow.

A further object of this invention is to provide an improved cross shaft or drawbar construction for a lift type implement, the angularity of which relative to the line of draft, may be readily adjusted by the operator from the tractor seat.

Still another object of this invention is to provide an improved plow frame for a moldboard plow wherein the plow beams are adjustably spaced apart for selective accommodation of a plurality of various sizes of plow bottoms.

The specific nature of this invention, as well as other objects and advantages thereof, will become apparent to those skilled in the art from the following detailed description, taken in conjunction with the attached sheets of drawings on which, by way of preferred example only, is illustrated two embodiments of this invention.

On the drawings:

Figure 1 is a side elevational view of a two bottom plow frame constructed in accordance with this invention and shown attached to a tractor having hydraulically operated draft links.

Figure 2 is a plan view of the plow frame.

Figure 3 is a right end view of the plow frame shown in Figure 1.

Figure 4 is a sectional view taken along the plane 4—4 of Figure 3.

Figure 5 is a detail elevational view illustrating a modification of this invention embodying an arrangement for shifting the angularity of the plow cross shaft from the tractor seat.

Figure 6 is a plan view of the device of Figure 5.

Figure 7 is an enlarged detail view showing a modified bearing for the drawbar.

Figure 8 is a sectional view of Figure 7 taken along the plane 8—8.

As shown on the drawings:

In brief this invention comprises a main frame structure which in the particular example of a two bottom plow comprises two plow beams secured in spaced relationship by adjustable length, transverse braces. A pair of upwardly sloping triangular plate members are respectively secured in opposed relationship to such main frame, thus defining an A frame. A cross shaft or drawbar of transversely arcuate or bowed shape is supported by such upwardly sloping plate members. The ends of such cross shaft are shaped to engage the vertically swingable, transversely spaced power lifted draft links of a well-known type of tractor while the top compression link of the tractor is pivotally secured to the vertex portion of the plate members. Lateral adjustment of the arcuate cross shaft will thus change the angularity of the main frame with respect to the longitudinal axis of the tractor and in the case of a plow, thereby effecting a change in the width of the furrow being cut. According to one modification of this invention, such lateral adjustment is effected by a member having one end secured to the cross shaft and the other end threaded and projecting through one of the vertical plate members and adjustably secured to such plate member by a pair of nuts. A modified arrangement for adjusting the lateral position of the cross shaft utilizes a bevel gear suitably secured to the cross shaft and threadably engageable with a fixed, transversely threaded shaft mounted on one of the plate members. By such arrangement, lateral shifting of the cross shaft may be readily effected without dismounting from the tractor by rotating the bevel gear by a mechanical connection terminating in a crank near the tractor seat.

In Figures 1 and 2 there is shown a plow constructed in accordance with this invention. A pair of parallel plow beams 10 of conventional configuration are spaced apart at their rear ends by adjustable length, diagonally disposed braces 11 and 12 provided respectively with bent end portions 11a and 12a. Brace 11 is secured to the left hand plow beam by a pair of bolts 13 inserted thru suitable transverse apertures in portion 11a and brace 12 is secured to the right hand plow beam by a pair of bolts 14 inserted thru suitable apertures in portion 12a. Braces 11 and 12 are positioned so as to overlap as shown in Figure 2 and at such point the braces are secured together by a pair of bolts 15. A spacing tube 16 is transversely disposed between plow beams 10 slightly ahead of brace 12 to maintain the forward ends of such beams in properly spaced relationship and such tube is secured to the beams 10 by a long bolt 17 passing transversely thru each beam 10 and thru tube 16. A second spacer tube 16a surrounds the projecting end of bolt 17 adjacent the outside face of left hand beam 10 as shown in Figure 3 for a purpose to be later described and a nut 17a clamps the beams against tube 16.

Near the forward end of the left hand plow beam 10 there is mounted a generally triangular, upstanding plate member 18 having a vertical base portion 19 which is secured to such beam by a plurality of transverse bolts 20. Plate member 18 has an intermediate portion 18a sloping inwardly and upwardly from the vertical portion 19 and the top end of such plate member is reversely bent to provide a vertical top portion 21. A second plate member 22 corresponding generally in shape to plate member 18 is mounted on the right hand plow beam 10 in opposed relationship to plate member 18. A vertical base portion 23 is provided on plate member 22 and a top vertical portion 24 is provided on the top of the sloped portion 22a of plate member 22. Base portion 23 is secured to the right hand plow beam 10 by the transverse bolts 12 to 14, two of which are also utilized to secure brace such beam. The top vertical portion 24 of plate member 22 is spaced apart from top vertical portion 21 by a tubular spacer 53 transversely disposed between such top vertical portions and is secured in such position by a transverse bolt 54 and nut 54a insertable in suitable transverse hole in plates 18 and 22 and thru tube 53. The spaced vertical top portions 21 and 24 define an opening 55 in which is pivotally mounted a top or compression link member 26 of a tractor 46 as will be explained.

A drawbar or cross shaft 27 is transversely mounted in plates 18 and 22 within apertures 28 and 29 provided respectively in plates 18 and 22 adjacent to beams 10. The apertures 28 and 29 receive cross shaft 27 snugly but permit cross shaft 27 to be laterally adjusted therein for a purpose to be later explained. Cross shaft 27 is preferably bent or bowed in a horizontal plane in a substantially circular arc so that when cross shaft 27 is shifted laterally of the plow beams 10, the ends of the cross shaft will be repositioned in a different angular relation to the plow beams for a purpose to be more fully explained later. Of course, an arcuate configuration represents only one of a plurality of possible configurations, the essential requirement being that the end portions of the cross shaft be angularly disposed relative to each other.

Each end 27a and 27b of cross shaft 27 is oppositely bent vertically at right angles to the horizontal portion of cross shaft 27 and a horizontal pin 30 is secured to each bent end of such cross shaft to form a crank shaped configuration. In the construction shown in Figure 1 apertures or slots 28 and 29 provided respectively in plate members 18 and 22 for the reception of cross shaft 27 must be of a size to permit the entrance of crank shaped end 27a or 27b. However when such slots are of a size to accommodate such crank ends, shaft 27 would not fit snugly in apertures 28 and 29. To overcome this difficulty, side plates 18 and 22 are mounted on beams 10 in such fashion that only the top portions of apertures 28 and 29 lie above beams 10 and cross shaft 27 rests on top of such beams and the top portions of apertures 28 and 29 of plates 18 and 22 engage the top surface of shaft 27. Thus when plate members 18 and 22 are secured to respective plow beams 10 by bolts 14 and 20 respectively, cross shaft 27 will then be snugly engaged by plates 18 and 22, the top portion of plow beams 10 then in effect defining the bottom surface of apertures 28 and 29. Cross shaft 27 may, however, be provided with but one crank shaped end and in that event the slots 28 and 29 provided respectively in plate members 18 and 22 may be of a size to just accommodate shaft 27. In either case a removable bearing member may be provided on the forward edge of each slot 28 and 29 to receive the wear normally received by the plate member itself.

In Figures 7 and 8 there is accordingly shown a modified construction for slidably supporting the cross shaft in plates 18 and 22. Each plate is provided with a cross shaft receiving aperture 60 and each aperture 60 is made somewhat wider than cross shaft 27 for a purpose to be presently explained. A cylindrical bearing member 62 provided with a longitudinally disposed rectangularly shaped groove or key slot 63 is vertically mounted on the forward edge 60a of slot 60 as shown in Figures 7 and 8. Edge 60a fits within and cooperates with key slot 63 to prevent transverse displacement of ring 62. Bearing member 62 fits snugly between the top and bottom surfaces of slot 60, thus when cross shaft 27 is assembled within apertures 60, the rear surface of each bearing member 62 tangentially contacts the forward face of cross shaft 27 and bearing member 62 cannot be re-moved from slot 60. Bearing member 62 is preferably constructed of a relatively hard material or of a material that can be hardened by suitable heat treatment. Inasmuch as cross shaft 27 bears primarily against each bearing member 62 when the plow is working, wear on plates 18 and 22 is transferred almost entirely to bearing members 62. Obviously, bearing members 62 may be readily replaced when worn by a new bearing member.

Cross shaft 27 is secured in a desired lateral position of adjustment relative to plow beams 10 by a rod-like arm 31. Arm is of L-shaped configuration and is provided with a threaded end 32 which is inserted through an enlarged transverse aperture in vertical portion 23 of plate member 22. A pair of nuts 33 is provided on end 32, such nuts being respectively disposed on opposite sides of plate member 22. Thus, when nuts 33 are screwed tightly against plate 22, rod 31 is secured relative to plate member 22. The other end 34 of arm 31 is bent downwardly at right angles to arm 31 and such downwardly bent end 34 projects through a vertically disposed hole 35 provided in the central portion of arcuate cross shaft 27. Hence, arm 31 secures cross shaft 27 in any desired lateral and angular position of cross shaft 27 within the limits of the threaded end portion of arm 31. The downwardly bent end 34 of arm 31 also serves to maintain the bent ends of cross shaft 27 in the same plane regardless of the lateral disposition of the cross shaft.

The above described arrangement requires manual adjustment of nuts 33 for the lateral angular shifting or positioning of the cross shaft. In Figures 5 and 6, however, there is shown a modified arrangement wherein cross shaft 27 may be mechanically moved transversely, and hence angularly of the plow beams 10 by actuation of a crank member extending forwardly to within close proximity of the tractor seat whereby the operator has only to turn a crank without dismounting from the tractor.

A shaft 36 having threaded ends 36a and 36b is non-rotatably secured to the vertical portion 19 of side plate member 18. A transverse hole 37 provided in side plate 18 above cross shaft 27 permits the threaded end 36b of shaft 36 to project thru plate 18 and a pair of nuts 38 on threaded end 36b of shaft 36 but disposed on opposite sides of side plate 18, secure such shaft against rotation when such nuts are tightened against plate 18. An offset portion 36c is provided in shaft 36 to raise the threaded end 36a a greater distance above cross shaft 27 while maintaining such threaded end parallel to shaft 27.

A U-shaped bracket or yoke 39 is secured in an upright position on top of cross shaft 27 by a bolt 39a inserted thru a suitable aperture in the bight portion of bracket 39 and thru a vertical hole 39b provided in the center of cross shaft 27. A nut 39c secures such bolt to cross shaft 27. A transverse hole 39e is provided near the top of each arm of U-shaped bracket 39 and such holes are aligned to support the free end of shaft 36. A bevel gear 40 is provided with a threaded axial bore 40a which cooperates with the threaded end 36a of shaft 36, being mounted adjacent the left hand arm of bracket 39 as shown in Figures 5 and 6.

A second U-shaped bracket or yoke 41 is mounted on shaft 36 in a horizontal position as shown in Figures 5 and 6, aligned holes 41a being provided in the arms of bracket 41 near the ends thereof to permit such mounting. A horizontal pin 42 is rotatably mounted in bracket 41 within a transverse hole 42a centrally provided in the bight portion of U-shaped bracket 41. A bevel gear 43 is mounted on that portion of pin 42 projecting rearwardly of the bight portion of bracket 41 and such gear is nonrotatably secured to pin 42 by a radially disposed set screw 43a provided in the hub portion of gear 43. The bevel gear 43 cooperates with bevel gear 40 to rotate gear 40 along the threaded portion 36a of shaft 36 as will be presently explained.

The forward end of pin 42 is bent at right angles as shown at 42b in Figure 6 and a flexible link 44 provided with an apertured end is placed over such upwardly bent end and is secured thereon by a cotter pin 44a. Link 44 is provided with a forwardly projecting eye portion 44b to which a rod 45 is connected. Rod 45 extends forwardly to a point within convenient reach of the operator of the tractor and terminates there in a crank (not shown).

Rotation of rod 45 rotates gear 43 thru the connection of flexible link 44 whereupon gear 40 is rotated about threaded end 36a of shaft 36. As shaft 36 is nonrotatably secured to side plate 18 by nuts 38, the only movement then can be the movement of brackets (or yokes) 39 and 41 along such shaft. As bracket 39 is secured to cross shaft 27 by bolt 39a, cross shaft 27 is then moved to either the right or the left in accordance with the direction of rotation of gear 43. Thus adjustment of the cross shaft 27 by this modified cross shaft adjusting arrangement can be readily effected by the tractor operator without the necessity for dismounting to effect such adjustment.

As was heretofore mentioned, an implement embodying this invention may be conveniently mounted upon any tractor of a well-known make which is provided with a power lift for vertically raising a pair of transversely spaced trailing draft links 47 pivotally connected to the tractor axle housing 56 at 57. The trailing ends of such draft links are pivotally mounted on the horizontally disposed pins 30 provided on the ends of cross shaft 27 and a linch pin 48 removably secures draft links 47 on such pins. A top link 26, pivotally secured to tractor 46 at 49, is pivotally mounted by a transverse pin 50 between the top vertical portions 21 and 24 of plates 18 and 22, and a linch pin 51 disposed in each end of pin 50 prevents displacement of pin 50.

Plow bottoms having different share lengths for cutting a wider or narrower furrow slice may be conveniently selectively utilized with the described frame by merely changing the spacing between plow beams 10. One such spacing is readily effected by moving the upper plow beam outwardly to the position shown in dotted outline in Figure 2. Braces 11 and 12 are readily extended by repositioning bolts 15 and 13. Plate member 18 is then assembled to the inside surface of upper beam 10 and hence occupies substantially the same position relative to plate 22. The second spacer tube 16a is placed adjacent tube 16 between beams 10 to fill the increased space thus made by moving the outside beam farther out. Similarly, another spacing may be obtained by shifting the mounting of plate 22 to the inside surface of its beam 10. By providing several different plate members 18 and 22 having a greater or lesser upward slope and by further adjustment of braces 11 and 12 other variations in the spacing of beams 10 may be readily and conveniently obtained, whereby a greater variety of plow bottoms of different widths may be accommodated without resorting to an entirely new frame for each size of plow bottoms.

With the plow bottoms 52 mounted on beams 10 and such beams in turn mounted on the hitch links of the tractor as shown in Figure 1, the plow is then ready for use. In plowing, and especially when plowing on the contour, the angularity of the plow bottoms relative to the line of draft often has to be adjusted in order to maintain a desired width of cut. Such adjustment of angularity is conveniently effected by the lateral angular shifting of cross shaft 27 or in effect, such shifting could be said to be along an arcuate path. The shifting of arcuate cross shaft 27 displaces the ends of such opposite directions longitudinally of beams 10; however, as the ends of such cross shaft are fixed to draft links 47, the net effect is to displace the plow beams and bottoms angularly with respect to the draft axis of the tractor. Cross shaft 27 is conveniently locked in any desired position of adjustment by the arm 31 as previously described. If, however, the arrangement shown in Figure 5 is utilized, then lateral positioning of cross shaft 27 may be effected by merely rotating crank rod 45, conveniently accomplished by the tractor operator without the necessity for dismounting from the tractor. The cooperation of gears 40 and 43 automatically locks cross shaft 27 in the selected position when rotation of such gears is stopped.

It will thus appear from the foregoing description that this invention provides an implement frame and particularly a frame for a multiple bottom moldboard plow, which conveniently permits a plurality of adjustments for accommodating plow bottoms of different widths. The arcuate cross shaft utilized with this plow frame and the mechanism for adjusting such cross shaft along an arcuate path affords a ready and convenient arrangement for positively changing the angularity of the implement frame relative to the line of draft. The arrangements for laterally positioning and securing the cross shaft relative to the frame are simple and convenient to use, particularly the modification of this invention wherein the tractor operator is not required to leave the tractor seat for such adjustment, thereby realizing a substantial saving in time and effort on the part of the operator.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of laterally spaced, vertically swingable draft links and a pivoted top link, a plow frame comprising a pair of beams, means for securing said beams in spaced parallel relationship, an upstanding plate member mounted on each of said beams in opposed relationship, means for pivotally connecting the tractor top link between the top portions of said plate members, a drawbar having a generally angular lengthwise configuration so that the end portions thereof are angularly disposed relative to each other, means for mounting said drawbar on said plate members with said angularly disposed end portions lying in a horizontal plane permitting generally arcuate, transverse movement of said drawbar relative to the plow beams, means for securing said drawbar in any selected transverse position relative to the plow beams, and means on the respective ends of said drawbar for attachment to the tractor draft links, whereby the angular relationship of the plow frame relative to the draft axis of the tractor may be adjusted.

2. For use with a tractor having a pair of laterally spaced draft links and an intermediate top link, an implement frame having at least one tool mounted thereon in depending relationship, a pair of upstanding plate-like elements secured to said frame in spaced opposed relationship, means in the top portions of said plate-like elements for connection to the tractor top link, a drawbar of generally angular configuration, slot means in the bottom portions of said plate-like elements for mounting said drawbar in horizontal, transverse relationship to said frame, said last mentioned means permitting transverse movement of said drawbar relative to said plate-like elements along a generally hyperbolic path, means for securing said drawbar in any selected transverse position relative to said frame, and means on the ends of said drawbar for respectively securing the tractor draft links thereto, whereby the angular relationship of said frame relative to the draft axis of the tractor may be adjusted.

3. For use with a tractor having a pair of laterally spaced, vertically swingable hitch links and an intermediate top link, a plow frame comprising a pair of beams secured in spaced relationship, an upstanding plate member mounted on each of said beams, means for pivotally connecting the tractor top link between the top portions of said plate members, a cross shaft mounted for lateral movement in said plate members, said cross shaft being transversely bent in a horizontal plane relative to the plow beams so that the end portions of said cross shaft are angularly disposed relative to each other, an adjusting mechanism having a first portion engageable with said cross shaft, another portion engageable with one of said plate members, means for selectively adjusting the separation of said first portion and said one plate member, whereby said cross shaft is secured in a desired transverse position, and means for mounting the tractor hitch links on the respective ends of said cross shaft, whereby the angular relationship of the plow frame relative to the longitudinal axis of the tractor may be changed by said adjusting mechanism for varying the width of cut of the furrow.

4. For use with a tractor having a pair of laterally spaced, vertically swingable hitch links and an intermediate top link, a plow frame comprising a pair of beams secured in laterally spaced relationship, an upstanding plate number mounted on each of said beams, said plate members being oppositely disposed and sloped inwardly toward their top portions, means for pivotally connecting the tractor top link between the top portions of said plate members, a cross shaft mounted for lateral movement in said plate members, said cross shaft being transversely bent in a horizontal plane relative to the plow beams, each of said plate members having a slot-like opening to snugly receive said cross shaft, and means for mounting the hitch links on the respective ends of said cross shaft, and means for laterally adjusting said cross shaft relative to the plow frame, whereby the angular relationship of the plow frame relative to the longitudinal axis of the tractor is changed for varying the width of cut of the furrow.

5. For use with a tractor having a pair of laterally spaced vertically swingable hitch links and an intermediate top link, a plow frame comprising a pair of beams secured in spaced relationship, an upstanding plate member mounted on each of said beams in opposed relation, means for pivotally connecting the tractor top link between the top portions of said plate members, each of said plate members having a slot-like opening, said openings being disposed in opposed relationship and immediately adjacent said beam, a cross shaft snugly mounted in said opposed openings for lateral movement in said plate members, said cross shaft being transversely bent in a horizontal plane relative to the plow beams, an adjusting arm having one end portion engageable with said cross shaft, said arm having its other end portion engageable with one of said plate members, means for adjustably securing the other end portion of said arm with respect to said one plate member, whereby said cross shaft is secured in a desired lateral position, and means for mounting the hitch links on the respective ends of said cross shaft, whereby the angular relationship of the plow frame relative to the longitudinal axis of the tractor is changed for varying the width of cut of the furrow.

6. For use with a tractor having a pair of laterally spaced, vertically swingable hitch links and an intermediate top link, a plow frame comprising a pair of beams secured in spaced relationship, an upstanding plate member mounted on each of said beams in opposed relation, means for pivotally connecting the tractor top link between the top portions of said plate members, each of said plate members having a transverse slot-like opening, a hardened bearing member secured in said opening adjacent the forward edge of said opening, a cross shaft mounted in said openings in bearing relationship with said bearing member for lateral movement in said plate members, said cross shaft being transversely curved relative to the plow beams, means for mounting the hitch links on the respective ends of said cross shaft, and means for laterally adjusting said curved cross shaft relative to the plow frame whereby the angular relationship of the plow frame relative to the longitudinal axis of the tractor is changed for varying the width of cut of the furrow.

7. For use with a tractor having a pair of laterally spaced, vertically swingable hitch links and an intermediate top link, a plow frame comprising a pair of beams secured in spaced relationship, an upstanding plate member mounted on each of said beams, said plate members being oppositely disposed and sloped inwardly toward their top portions, means for pivotally connecting the tractor top link between the top portions of said plate members, each of said plate members having a slot-like opening, said openings being disposed in opposed relationship and adjacent the plow beams, a hardened cylindrical bearing member detachably mounted on the forward edge of each of said slot like openings, a cross shaft mounted for lateral movement in said openings having a forwardly facing surface in bearing relation with said bearing members, said cross shaft being transversely curved relative to the plow beams, an adjusting arm having one end portion engageable with said cross shaft, said arm having another end portion traversing one of said plate members, means for adjustably securing the other end portion of said arm with respect to said plate member whereby said cross shaft is secured in a desired lateral position, and means for mounting the hitch links on the respective ends of said cross shaft, whereby the angular relationship of the plow frame relative to the longitudinal axis of the tractor is variable by said adjusting arm for varying the width of cut of the furrow.

References Cited in the file of this patent

UNITED STATES PATENTS

| | | |
|---|---|---|
| 1,255,331 | Ostenberg | Feb. 5, 1918 |
| 1,476,738 | Taylor | Dec. 11, 1923 |
| 1,692,750 | Marran | Nov. 20, 1928 |
| 2,351,473 | Benjamin | June 13, 1944 |
| 2,457,163 | Lansing | Dec. 28, 1948 |
| 2,530,565 | Briscoe | Nov. 21, 1950 |

FOREIGN PATENTS

| | | |
|---|---|---|
| 940,739 | France | June 7, 1948 |
| 543,659 | Great Britain | Mar. 6, 1942 |
| 619,090 | Great Britain | Mar. 3, 1949 |